(12) United States Patent
Klassen

(10) Patent No.: US 10,540,726 B2
(45) Date of Patent: Jan. 21, 2020

(54) METHODS AND APPARATUS FOR AUTOMATICALLY DEFINING MESSAGES IN RESPONSE TO A USER-PERFORMED ACTIVITY AND WITH CORRELATED USER DATA

(71) Applicant: Rally Health, Inc., Washington, DC (US)

(72) Inventor: Ian H. Klassen, Campbell, CA (US)

(73) Assignee: Rally Health, Inc., Washington, DC (US)

( * ) Notice: Subject to any disclaimer, the term of this patent is extended or adjusted under 35 U.S.C. 154(b) by 0 days.

(21) Appl. No.: 14/219,824

(22) Filed: Mar. 19, 2014

(65) Prior Publication Data

US 2015/0269354 A1   Sep. 24, 2015

(51) Int. Cl.
*G06Q 50/00* (2012.01)

(52) U.S. Cl.
CPC .................................... *G06Q 50/01* (2013.01)

(58) Field of Classification Search
CPC ..................................................... G06Q 50/01
USPC ......................................................... 705/319
See application file for complete search history.

(56) References Cited

U.S. PATENT DOCUMENTS

| | | | |
|---|---|---|---|
| 6,585,622 B1* | 7/2003 | Shum et al. | 482/8 |
| 6,866,613 B1* | 3/2005 | Brown et al. | 482/8 |
| 6,921,351 B1* | 7/2005 | Hickman et al. | 482/8 |
| 8,200,323 B2* | 6/2012 | DiBenedetto et al. | 600/519 |
| 8,341,557 B2* | 12/2012 | Pisula et al. | 715/863 |
| 9,304,205 B2* | 4/2016 | Heikes | G01C 22/006 |
| 2005/0216867 A1* | 9/2005 | Marvit et al. | 715/863 |
| 2007/0146116 A1 | 6/2007 | Kimbrell | |
| 2008/0009275 A1* | 1/2008 | Werner et al. | 455/414.2 |
| 2009/0157312 A1* | 6/2009 | Black | G01C 21/30 701/414 |
| 2010/0088023 A1* | 4/2010 | Werner | 701/206 |
| 2010/0267521 A1 | 10/2010 | Matsunaga | |
| 2010/0292600 A1* | 11/2010 | DiBenedetto et al. | 600/520 |
| 2011/0047182 A1* | 2/2011 | Shepherd | G06Q 10/10 707/780 |
| 2011/0154041 A1* | 6/2011 | Godfrey et al. | 713/171 |
| 2012/0015778 A1* | 1/2012 | Lee | A63B 71/0622 482/8 |
| 2012/0173978 A1* | 7/2012 | Lee et al. | 715/716 |
| 2012/0221495 A1 | 8/2012 | Landers | |
| 2012/0252418 A1* | 10/2012 | Kandekar | H04W 4/021 455/414.1 |
| 2012/0283855 A1* | 11/2012 | Hoffman et al. | 700/91 |

(Continued)

OTHER PUBLICATIONS

Beyond the Miles Blog; Oct. 19, 2013; "Welcome to Runkeeper on IOS7"; www.runkeeper.com.*

(Continued)

*Primary Examiner* — Tamara Griffin
(74) *Attorney, Agent, or Firm* — Cooley LLP

(57) ABSTRACT

A user can perform in an activity which can be identified and/or tracked by a device associated with the user, such as a mobile communication device. Data can be identified and collected before, during and after the activity. A message can be defined based on the activity and the data, and presented to the user on the device. The user can alter or approve the message such that a form of the message is sent to a compute device, such as a social media network.

25 Claims, 4 Drawing Sheets

(56) References Cited

U.S. PATENT DOCUMENTS

| | | | | |
|---|---|---|---|---|
| 2012/0308077 | A1* | 12/2012 | Tseng | G06Q 50/01 382/103 |
| 2013/0166048 | A1* | 6/2013 | Werner et al. | 700/91 |
| 2014/0031959 | A1* | 1/2014 | Glode | G06F 19/3481 700/91 |
| 2014/0164611 | A1* | 6/2014 | Molettiere | A61B 5/6838 709/224 |
| 2014/0172873 | A1* | 6/2014 | Varoglu | G06F 17/30595 707/748 |
| 2014/0289312 | A1* | 9/2014 | Jafarifesharaki | H04L 67/42 709/203 |
| 2015/0127748 | A1* | 5/2015 | Buryak | H04L 51/32 709/206 |
| 2015/0168162 | A1* | 6/2015 | Subramanian | G01C 21/28 701/523 |
| 2015/0178388 | A1* | 6/2015 | Winnemoeller | G06F 16/951 707/722 |
| 2015/0236866 | A1* | 8/2015 | Colby | G09B 7/02 709/205 |
| 2015/0324751 | A1* | 11/2015 | Orenstein | G06F 19/3481 702/3 |

OTHER PUBLICATIONS

Beyond the Miles Blog; Nov. 30, 2013; "How to Broadcast your runs while on the go"; www.runkeeper.com.*

Runkeeper Blog; Feb. 27, 2014; How to post photos and notes in Runkeeper.*

Redding, Jim. How to Post Photos and Notes in Runkeeper. blog. runkeeper.com. Feb. 27, 2014. [Retrieved on: Jan. 3, 2017]. Retrieved from internet: <URL:https://blog.runkeeper.com/1008/how-to-post-photos-and-notes-in-runkeeper/>. entire document.*

Buckingham, Simon. The Best Free Apps for Runners. SHAPE.com. Jun. 1, 2013. [Retrieved on: Jan. 3, 2017]. Retrieved from internet: <URL:https://web.archive.org/web/20130601074102/http://www.shape.com/fitness/training-plans/best-free-apps-runners?page=4>. entire document.*

Live Trekker. Live Trekker restores your trip. waybackmachine. Dec. 6, 2012. [Retrieved on: Jun. 18, 2018]. Retrieved from internet: <URL:https://web.archive.org/web/20131215125426/http://www.net4tech.net/2012/12/live-trekker-restores-your-trip_6.html>. entire document (Year: 2012).*

HipGeo. HipGeo Debuts Only Free App to Automatically Create Location-Based Story Streams From Photos, Video and Text. businesswire.com. Jul. 31, 2012. [Retrieved on: Jun. 18, 2018]. <https://www.businesswire.com/news/home/20120731005521/en/HipGeo-Debuts-Free-App-Automatically-Create-Location-Based>. (Year: 2012).*

Moves for iPhone, [online], [retrieved on Sep. 17, 2013]. Retrieved from the Internet: <URL: http://www.moves-app.com>. (3 pgs).

MapMyWalk GPS Walking—Android Apps on Google Play, [online], [retrieved on Sep. 17, 2013]. Retrieved from the Internet: <URL: https://play.google.com/store/apps/details?id=com.mapmywalk.android2&hl=en >. (4 pgs).

Mobile Cycling App. Bicycle GPS Tracking, Cycling Training Apps / MapMyRide, [online], [retrieved on Sep. 17, 2013]. Retrieved from the Internet: <URL: http://www.mapmyride.com/app/>. (3 pgs).

My Tracks—Android Apps on Google Play, [online], [retrieved on Sep. 17, 2013]. Retrieved from the Internet: <URL: https://play.google.com/store/apps/details?id=com.google.android.maps.mytracks&hl=en>. (3 pgs).

Runtastic apps—Runtastic—makes sports fantastic, [online], [retrieved on Sep. 17, 2013]. Retrieved from the Internet: <URL: http://www.runtastic.com/en/apps/runtastic>. (2 pgs).

Runkeeper—GPS Track Run Walk—Android Apps on Google Play, [online], [retrieved on Sep. 17, 2013]. Retrieved from the Internet: <URL: https://play.google.com/store/apps/details?id=com.fitnesskeeper.runkeeper.pro >. (2 pgs).

* cited by examiner

METHODS AND APPARATUS FOR AUTOMATICALLY DEFINING MESSAGES IN RESPONSE TO A USER-PERFORMED ACTIVITY AND WITH CORRELATED USER DATA

BACKGROUND

Some embodiments described herein relate to user-performed activity detection and monitoring, identification and collection of data associated with the user-performed activity, and automatic generation of messages based on the user-performed activity and the identified and collected data associated with the user-performed activity.

Some known methods for activity tracking allow users to monitor and collect data on their activities. Such known methods, however, typically require the user to indicate when an activity starts and stops, for example by pushing a button. A need therefore exists for methods and apparatus for detecting the beginning and/or end of an activity and providing automatic suggestions based on the detected activity and data associated therewith.

SUMMARY

A mobile communication device associated with a user can identify and/or track an activity performed by the user. Data can be identified and collected before, during and after the activity. A message can be defined based on the activity and the data, and presented to the user on the mobile communication device. The user can alter or approve the message such that a form of the message is sent to a compute device, such as a social media network.

DETAILED DESCRIPTION

Some embodiments described herein relate to identifying a user-performed activity, which may include exercise-related activities such as walking, running, biking, hiking, etc. A user-performed activity can be optionally associated with an event or location, for example such as watching a sporting event in a known venue, riding an amusement park ride at an amusement park, attending a restaurant, shopping mall, tradeshow, etc. Information, data and/or message(s) representing the user-performed activity can be captured and/or identified by a monitoring device such as, for example, a global positioning system (GPS)-enabled communication device.

Some embodiments described herein relate to identifying a point-of-interest, which can be, for example, a park, museum, tourist attraction, restaurant, shopping mall, amusement park ride, sporting event, etc. Information and/or data representing the point-of-interest can be captured and/or or identified by a monitoring device such as, for example, a GPS-enabled communication device.

Some embodiments described herein relate to data associated with (1) the user, (2) the user-performed activity, and/or (3) the point-of-interest. The data associated with the user-performed activity can be generated during the user-performed activity and/or accessed during the user-performed activity. The data associated with the point-of-interest can be associated with a location of the user-performed activity.

A message can be defined based on the data, the user-performed activity, and/or the point-of-interest. A representation of the message can be sent and/or displayed such that a user can alter the representation of the message or confirm/approve the representation of the message. In some embodiments, if the user alters the representation of the message, an altered representation of the message can be sent and or displayed such that the user can alter or confirm/approve the altered representation of the message. The representation of the message or the altered representation of the message can be sent to a compute device. The compute device can be separate from the mobile communication device. For example, the compute device can be a server that is part of a social media application or platform. The representation of the message or the altered representation of the message can be defined based on a format associated with the compute device (e.g., a format compatible with the social media application or platform).

Figure 1:
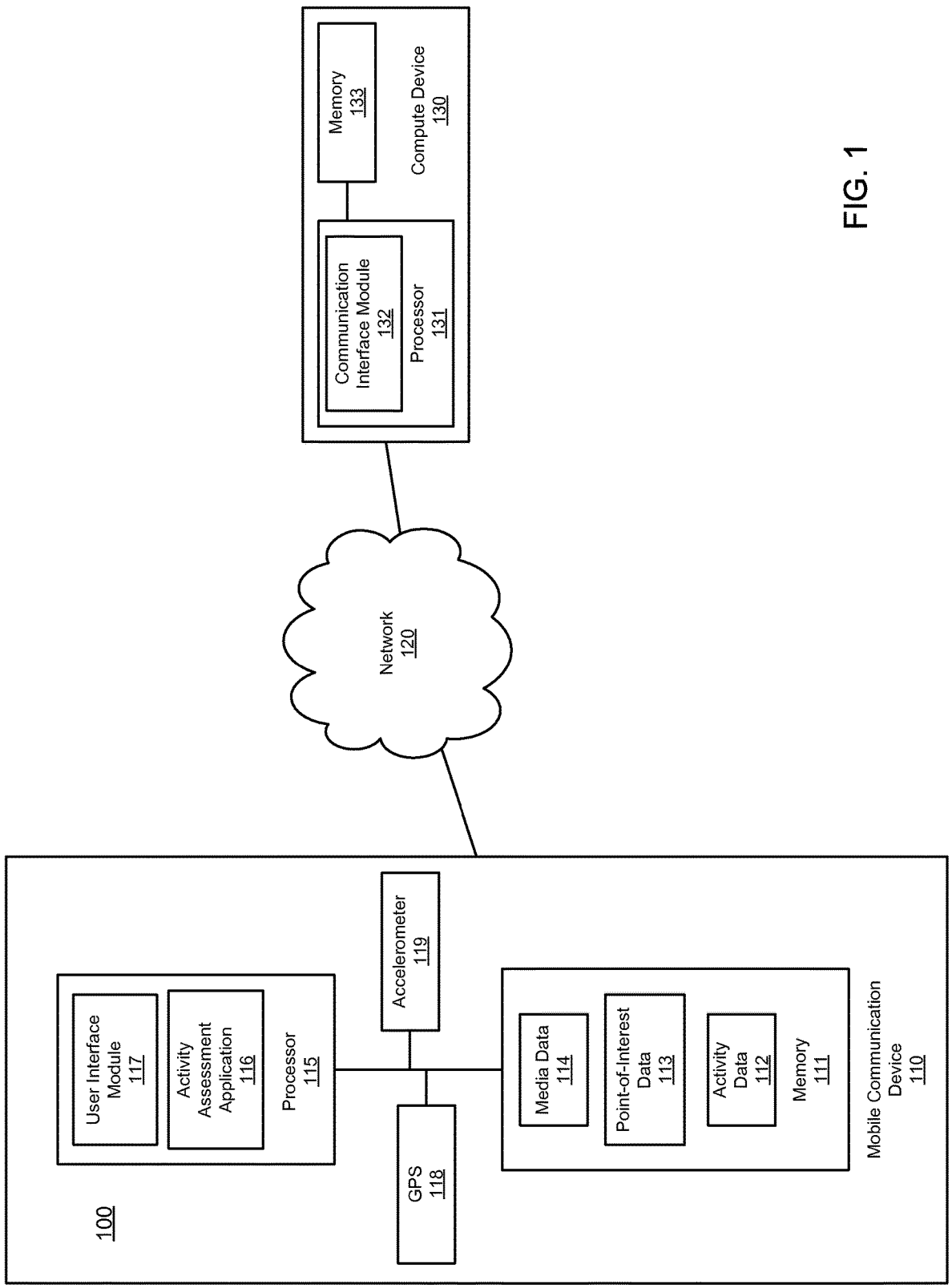
FIG. 1 is a schematic diagram of an activity assessment system, according to an embodiment.

FIG. 1 is a schematic diagram of an activity assessment system 100 according to an embodiment. The system 100 includes a mobile communication device 110 and a compute device 130, each communicatively coupled via a network 120.

The mobile communication device 110 can be a mobile computing entity with communication capabilities, such as a smartphone (e.g., an iPhone®, an Android® device, a Windows® phone, a Blackberry® phone, etc.), a tablet computer (e.g., an Apple iPad®, a Samsung Nexus® device, a Microsoft Surface® device, etc.), and/or any other suitable computing entity with communication capabilities. The mobile communication device 110 includes a memory 111, a processor 115, a GPS 118, and an accelerometer 119.

The processor 115 can be, for example, a general purpose processor, a Field Programmable Gate Array (FPGA), an Application Specific Integrated Circuit (ASIC), a Digital Signal Processor (DSP), and/or the like. The processor 115 can be configured to retrieve data from and/or write data to memory, e.g., the memory 111, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

The mobile communication device 110 includes an activity assessment application 116 and a user interface module 117, according to an embodiment. The activity assessment application 116 and the user interface module 117 each can be a hardware module and/or a software-based module (that is stored in the memory 111 and/or executed in the processor 115 of the mobile communication device 110).

The activity assessment application 116 can be configured to send, receive, or access data from the user interface module 117, the GPS 118, the accelerometer 119, the memory 111 of the mobile communication device 110, and the compute device 130. Although shown in FIG. 1 as being a part of processor 115 and/or stored in memory 111, in other embodiments, the application can be located external to the mobile communication device. For example, the application can be located on a compute device (not shown) and communicatively coupled to the mobile communication device and/or the compute device via the network.

The user interface module 117 can be any suitable module to receive a signal or input at the mobile communication device 110. The user interface module 117 can be configured to receive, from a user, for example, a signal or an input via a digital touch screen, a digital keyboard, a qwerty keyboard, a microphone (e.g., to receive a person's voice), a camera (e.g., to receive an image of a person's facial expression and/or a person's eye movement), etc.

The GPS module 118 can be configured to detect and/or monitor activity of the user and/or the mobile communication device 110, as used by the user. For example, the GPS module 118 can track the location of the mobile communication device 110 as it is carried and/or worn by the user. In this way, GPS 118 can provide information that can be used to track a distance traveled and/or speed of the user, when the user walks, runs, bikes, etc. As another example, the GPS 118 can provide information that can be used to track and/or identify the location of the user relative to other coordinates. Further to this example, the GPS 118 can provide information that can be used to identify the distance of the mobile communication device 110 relative to a point-of-interest, such as a park, museum, concert, etc.

The accelerometer 119 can be configured to detect and/or monitor activity of the user and/or the mobile communication device 110, as used by the user. In this way, the accelerometer 119 can provide data that can be used to identify a user-performed activity. For example, the accelerometer 119 can function similar to a pedometer configured to detect and/or monitor user activity by counting steps taken by the user. The data based on the accelerometer 119 and associated with the steps taken by the user, for example, can be used to identify a user-performed activity such as walking, jogging and/or running. The activity data 112 can include data representing a user-performed activity. The activity data 112 can include, for example, data representing exercise activity such as walking, running, biking, hiking, riding, weight-lifting, etc. In some embodiments, the activity data 112 can be associated with riding an amusement park ride, watching a sporting event, shopping, etc.

The point-of-interest data 113 can include data representing points of interest. The point-of-interest data 113 can include, for example, data representing and/or identifying a park, museum, tourist attraction, restaurant, shopping mall, amusement park, sporting event, tradeshow, gymnasium, etc.

The media data 114 can include, for example, image data, video data, music data, physiological data, motion data, etc. The media data 114, for example, can include data generated and/or loaded by a user (e.g., uploaded music such as mp3 or wav files; photographs taken by the mobile communication device and/or other compute devices in jpeg, gif, etc. formats), and/or data automatically collected by the mobile communication device (e.g., data representing the location of the mobile communication device). The media data 114 can be, for another example, data accessed during a user-performed activity. The media data 114 can include, for example, music data representing a song that the user listened to while performing a user-performed activity, such as running through a park. Alternatively, the media data 114 can be generated during a user-performed activity. The media data 114 can also be a combination of data accessed during a user-performed activity and data generated during a user-performed activity. The media data 114 can include, for example, image data representing a photograph captured by the mobile communication device, as used by the user, while performing a user-performed activity, such as an image of the Empire State Building captured while the user walks through New York City. As another example, the media data 114 can include image data captured by a compute device other than the mobile communication device. Further to this example, the media data 114 can include image data captured by an image capture device associated with an amusement park, where the image data can be associated with a user-performed activity, such as a photograph of the user riding on a roller-coaster at the amusement park.

The network 120 can be the Internet, an intranet, a local area network (LAN), a wide area network (WAN), a virtual network, a telecommunications network, any other suitable communication system and/or combination of such networks. The network 120 can be implemented as a wired and/or wireless network.

The compute device 130 includes a processor 131, a communication interface module 132, and a memory 133. The compute device 130 can be, for example, a server. Although only one compute device 130 is shown, multiple compute devices 130 such as a group of servers can be coupled to the network 120. The compute device 130 can be public, private, or a combination thereof. For example, the compute device 130 can be associated with a social media application or platform, an email account, a repository, an amusement park, a sports ground, etc.

The processor 131 can be, for example, a general purpose processor, a Field Programmable Gate Array (FPGA), an Application Specific Integrated Circuit (ASIC), a Digital Signal Processor (DSP), and/or the like. The processor 131 can be configured to retrieve data from and/or write data to memory, e.g., the memory 133, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

The communication interface module 132 can be configured to provide client/server communication and/or interface functionality. The communication interface module 132, for example, can be configured to send, receive and access data to, from and/or at the mobile communication device 110 via the network 120. For example, the communication interface module 132 can be configured to receive a signal representing a message associated with a user-performed activity from the mobile communication device 110 via the network 120. The communication interface module 132, for example, can be associated with an application programming interface (API) for a service provided by the compute device 130. Further to this example, the communication interface module 132 can include an API associated with a social media application or platform.

Figure 2:
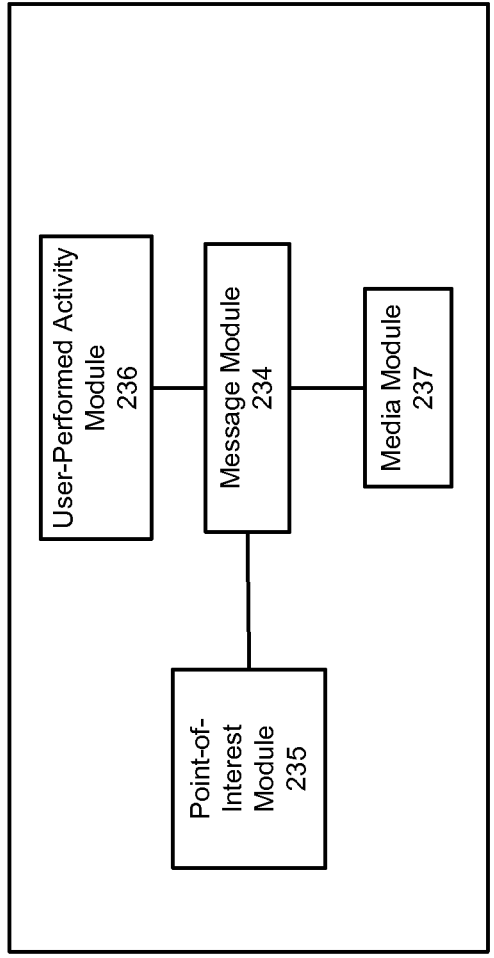
FIG. 2 is a schematic diagram of the activity assessment application, according to an embodiment.

FIG. 2 is a schematic diagram of an activity assessment application according to an embodiment. For example, activity assessment application 216 can be similar to the activity assessment application 116 of FIG. 1. The activity assessment application 216 includes a message module 234, a point-of-interest module 235, a user-performed activity module 236, and a media module 237.

The message module 234 can be communicatively coupled to the point-of-interest module 235, the user-performed activity module 236, and/or the media module 237. The message module 234 can be configured, for example, to send, receive and access user-performed activity data and/or a user-performed activity identifier to, from and/or at the user-performed activity module 236. The message module 234 can be configured, for example, to send, receive and access media data to, from and/or at the media module 237. The message module 234 can be configured, for example, to send, receive and access point-of-interest data or a point-of-interest identifier to, from and/or at the point-of-interest module 235. The message module 234 can be configured to define a first message based at least in part on data associated with a user, a user-performed activity identifier, and/or a point-of-interest identifier. The message module 234 can be configured to send a representation of the first message, via the user interface module 117 for example, such that the user, at a first time, can alter or confirm the representation of the first message to produce a second message. The first message and/or the second message defined by the message module 234 and/or altered by the user can include, for example, data associated with the user, such as media data 114, point-of-interest data 113, activity data 112, data associated with GPS 118, and/or data associated with accelerometer 119. Further to this example, the first message and/or the second message can include a representation of media data that the user accessed and/or generated at the mobile communication device 110 (e.g., a song and/or an album cover associated with a song that the user listened to).

The point-of-interest module 235 can be communicatively coupled to the message module 234, the user-performed activity module 236 and/or the media module 237. The point-of-interest module 235 can be configured to send, receive, and access data associated with the user and/or the mobile communication device 110 to, from and/or at the activity data 112, the point-of-interest data 113, and/or the media data 114. The point-of-interest activity module 235 can be configured to receive and access data generated at GPS 118 and/or accelerometer 119. Additionally, the point-of-interest module 235 can be configured to receive and access data associated with the user and/or the mobile communication device 110 from and/or at a compute device (not shown) separate from the mobile communication device 110. The point-of-interest module 235, for example, can access data stored on a server external to the mobile communication device 110. The point-of-interest module 235 can be configured to identify a point-of-interest from multiple points of interest based at least in part on at least one of (1) data associated with the user and/or the mobile communication device 110, (2) data accessed at the mobile communication device 110, or (3) data generated at the mobile communication device 110, to produce a user-performed activity identifier. The point-of-interest module 235, for example, can identify a point-of-interest such as the Washington Monument based on GPS data (e.g., data generated at GPS 118) when the GPS data correlates to a location within a predefined range of the Washington Monument. Further to this example, in some instances, the point-of-interest module 235 can identify the point-of-interest based on the GPS data and/or data at media data 114 (e.g., such as a photograph of the Washington Monument). As another example, the point-of-interest module 235 can identify a point-of-interest based on data associated with a compute device (not shown) separate from the mobile communication device 110 (e.g., data stored on a server or group of servers and representing a photograph). The point-of-interest module 235 can receive data representing one or more points of interest, for example, at the user interface module 117. In some instances, a point-of-interest can be defined by a user at the mobile communication device 110. For example, a user can define a point-of-interest based on GPS data that correlates to a location within a predefined range of the user's neighborhood. Subsequently, the point-of-interest module 235, for example, can identify the point-of-interest defined by the user (i.e., the user's neighborhood) based on GPS data (e.g., data generated at GPS 118) when the GPS data correlates to a location within a predefined range of the user's neighborhood. In yet another instance, data representing a point-of-interest can be defined at a compute device (not shown) separate from the mobile communication device 110.

The user-performed activity module 236 can be communicatively coupled to the message module 234, the media module 237 and/or the point-of-interest module 235. The user-performed activity module 236 can be configured to send, receive, and access data associated with the user and/or the mobile communication device 110 to, from and/or at the media data 114, the point-of-interest data 113, and/or the activity data 112. The user-performed activity module 236 can receive and access data generated at GPS 118 and/or accelerometer 119. Additionally, the user-performed activity module 236 can receive and access data associated with the user and/or the mobile communication device 110 from and/or at a compute device (not shown) separate from the mobile communication device 110. The user-performed activity module 236, for example, can access data stored on a server external to the mobile communication device 110. The user-performed activity module 236 can be configured to identify a user-performed activity from multiple predefined user-performed activities based at least in part on at least one of (1) data associated with a user and/or the mobile communication device 110, (2) data generated at the mobile communication device 110, or (3) data accessed at the mobile communication device 110. The user-performed activity module, for example, can identify a user-performed activity such as walking, running, jogging, etc. based on data generated at GPS 118 and/or accelerometer 119. More specifically, changes in GPS data and/or accelerometer data can be identified as correlating to certain types of user activities such as walking, running, jogging, etc. In some instances, the user-performed activity module 236, for example, can identify a user-performed activity, such as cycling, hiking, swimming, etc. based on activity data 112. The user-performed activity module can receive data representing one or more user-performed activities, for example, at the user interface module 117. In some instances, data representing a user-performed activity can be defined by a user at the mobile communication device 110. For example, a user can define a user-performed activity based at least in part on at least one of GPS data (e.g., data generated at GPS 118), accelerometer data (e.g., data generated at accelerometer 119), and/or point-of-interest data (e.g., data stored at point-of-interest data 113) that correlates to unicycling. Subsequently, the user-performed activity module 236, for example, can identify the user-performed activity defined by the user (e.g, unicycling). In yet another instance, data representing a user-performed activity can be defined at a compute device (not shown) separate from the mobile communication device 110.

The media module 237 can be communicatively coupled to the message module 234, the user-performed activity module 236 and/or the point-of-interest module 235. The media module 237 can be configured to send, receive, and access data associated with the user to, from and/or at the media data 114, the point-of-interest data 113 and/or the activity data 112. The media module 237 can be configured to receive and/or access a compute device (not shown) other than compute device 130. The media module 237, for example, can be configured to receive image data associated with media data accessed by a user at the mobile communication device 110 (e.g., image data including an album cover associated with media data including a song accessed at the mobile communication device 110). The media module 237, for example, can manage and/or archive media data such as playlists, photographs, albums of photographs, etc. In some instances, the media module 237 can manage links and/or associations between media data and other data, such as links and/or associations between photographs, songs, user-performed activities and/or points-of-interest. In some instances, the media module 237, for example, can generate and/or identify a link (e.g., a hyperlink associated with a cloud server) associated with media data stored separate from the mobile communication device 110. As another example, the media module 237 can identify a person, entity and/or an object based on media data (e.g., data at media data 114), to produce a person identifier, entity identifier and/or an object identifier. Further to this example, the message module 234 can define a message based at least in part on at least one of the person identifier, entity identifier and/or object identifier. In yet another example, the message module 234 can send to a compute device associated with at least one of the person identifier or entity identifier, a representation of the message.

Figure 3:
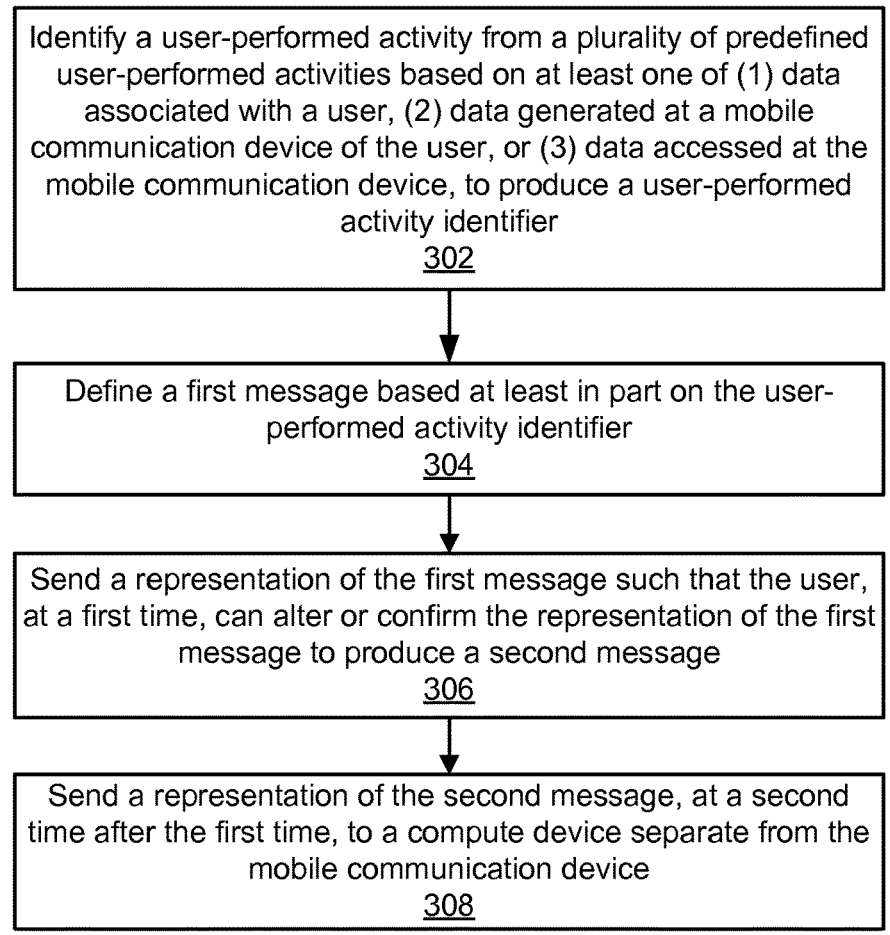
FIG. 3 is a flow chart of a method for activity assessment, according to an embodiment.

FIG. 3 is a flow chart of a method for activity assessment, according to an embodiment. The method illustrated in FIG. 3 can be executed on a processor, for example, the processor 115 of the mobile communication device 110, and/or a processor of a compute device (not shown) external to the mobile communication device 110.

A user-performed activity can be identified and a user-performed identifier can be produced based on the identification of the user-performed activity, at 302. The user-performed activity can be identified from multiple predefined activities based on data associated with a user. The data associated with a user can include media data such as image data, video data, music data, physiological data, or motion data. For example, the data associated with a user can include music data accessed by the user during the user-performed activity, such as a jog. As another example, the data associated with a user can include image data generated during the user-performed activity, such as an image of a tree that the user captured during a walk in a park. As yet another example, the data associated with a user can include physiological data generated during the user-performed activity, such as heart-rate data of the user during a hiking through a mountain trail. As another example, the data associated with a user can include motion data generated during the user-performed activity, such as average speed data associated with the user while skiing down a mountain.

In some instances, the predefined activity can be defined by a user of the mobile communication device. For example, a user can define an activity via a user interface module (such as user interface module 117 of FIG. 1) at the mobile communication device of the user. In another instance, the predefined activity can be defined by a party other than the user and a signal representing the predefined activity can be received by the mobile communication device of the user.

In some instances, the data associated with the user can be received at the mobile communication device of the user from a device other than the mobile communication device of the user, such as a compute device associated with a social media application or platform. For example, the data associated with the can include media data such as image data, video data, or music data. In some instances, the data associated with the user can be received from a server. For example, the data associated with the user can include data stored on a cloud server (not shown) associated with the user. As another example, the data associated with the user can be received from a private server (not shown) of a party other than the user.

At 304, a message can be defined. The message can be based on, for example, data associated a user, data received from and/or stored at a compute device, a format associated with a compute device and/or a mobile communication device of a user, data generated when the mobile communication device was located within a predefined range of a point-of-interest, data generated during the user-performed activity, and/or data accessed during the user-performed activity. For example, the message can include video data captured by the user during a hike in the mountains, and/or text data including a description of the hiking trail. In a similar example, the video data can be associated with the user-performed activity (e.g., the hike), but captured prior to the user-performed activity. Further to this example, the text data can include data received from a compute device external to the mobile communication device of the user.

As another example, the message can include an image stored on a compute device, such as a server of social media application or platform, and associated with the user-performed activity or a point-of-interest, such as an image of the user running near the Empire State Building that is posted to the user's social media account. As yet another example, the message can include a representation of music data that was accessed by the user during the user-performed activity, and image data associated with the music data, such as image data representing the musician of the music data or cover art work for the music data. Further to this example, the representation of the music data and/or the associated data can be either located on the mobile communication device of the user or on a compute device separate from the mobile communication device.

In some instances, more than one message can be defined. For example, a first message can include image data and video data, and a second message can include image data, video data, and music data. Further to this example, the image data in the first message can be different or the same as the image data in the second message.

At 306, a representation of the message or group of messages can be sent such that the representation of the message or group of messages is displayed at the mobile communication device of the user. In some instances, multiple representations of a message can be sent to the user such that the multiple representations are displayed at the mobile communication device. The multiple representations can be displayed at the mobile communication device concurrently or sequentially.

A user can approve of one or more of the multiple representations, or alter one or more of the multiple representations. If the user approves of one or more of the multiple representations, for example, the approved representation(s) can be sent to a compute device separate from the mobile communication device. In some instances, if the user alters one or more of the multiple representations, for example, the altered representation(s) can be sent to a compute device separate from the mobile communication device. As another example, the user can reject one or more of the representations. If the user rejects one or more of the representations, for example, a new message can be defined based on data associated with the user, data received from and/or stored at a compute device, a format associated with a compute device and/or a mobile communication device of a user, data generated when the mobile communication device was located within a predefined range of a point-of-interest, data generated during the user-performed activity, and/or data accessed during the user-performed activity. In some instances, based at least in part on the user's rejection of the message, the new message can be defined based on data and/or a format different than the data and/or format(s) that the message defined at 304 was based on; a representation of the new message can be sent such that the representation of the new message is displayed at the mobile communication device of the user. The user can alter, approve, or reject the representation of the new message. The user's approval, alteration, or rejection of the representation of the message can be performed with a single user-input step. For example, a user can touch a digital screen to indicate confirmation of the representation of a message. In another instance, the user's approval, alteration, or rejection of the representation of the message can be performed with more than a single user-input step. In some instances, a second message can be produced based on an alteration of the representation of the message or a confirmation of the representation of the message.

At 308, a representation of the second message and/or the new message can be sent to a compute device (such as compute device 130 of FIG. 1). The compute device can be selected from a list of predetermined or preselected compute devices. In some instances, the compute device can be separate from the mobile communication device of the user. For example, a compute device can include a social media application or platform, software to implement an email system that includes the email account of the user, blogging application or platform, repository of the user, a communication device other than the mobile communication device, etc.

In some instances, the compute device can be selected by a user of the mobile communication device. In other instances, multiple compute devices can be selected. For example, a first message can be sent to a first compute device, such as a server that implements a social media account of the user, and a second message can be sent to a second compute device, such as a server that implements a blogging application or platform.

In some instances, the compute device can be associated with a specific format. The format associated with the compute device can include or define a limit on a quantity of characters, a data type, an application programming interface (API), etc. For example, a format associated with a social media platform can include a maximum limit of characters. As another example, a format can include image data but not video data. In some instances, the message can be defined by the mobile communication device of the user based on a format associated with the compute device, such as a social media application or platform that restricts data of a certain quantity or size. In the case of multiple messages and multiple compute devices, a representation of a first message associated with a format of a first compute device can be sent to the first compute device, and a representation of a second message associated with a format of a second compute device can be sent to the second compute device.

Figure 4:
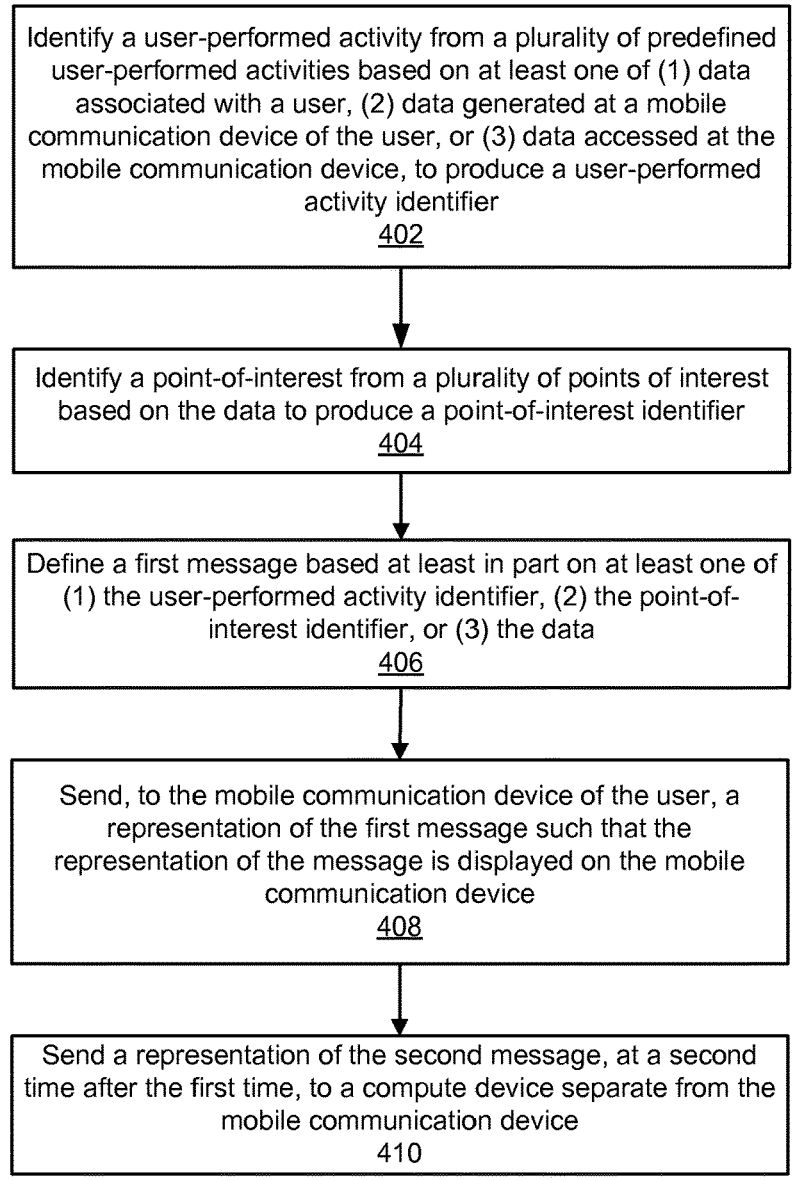
FIG. 4 is a flow chart of a method for activity assessment, according to an embodiment.

FIG. 4 is a flow chart of a method for activity assessment, according to an embodiment. The method illustrated in FIG. 4 can be executed on a processor, for example, the processor 115 of the mobile communication device 110, and/or a processor of a compute device (not shown) external to the mobile communication device 110. More specifically, the method of FIG. 4 can be executed by a processor executing, for example, the activity assessment application 116.

A user-performed activity can be identified, at 402. The user-performed activity can be identified from multiple predefined activities based on data associated with a user and/or a communication device of the user. The user-performed activity can be identified from multiple predefined user-performed activities based at least in part on at least one of (1) data associated with the user, (2) data generated at a mobile communication device of the user, or (3) data accessed at the mobile communication device, to produce a user-performed activity identifier. The data associated with a user can include media data such as image data, video data, music data, physiological data, or motion data. For example, the data associated with a user can include music data accessed by the user during the user-performed activity, such as a jog. As another example, the data associated with a user can include image data generated during the user-performed activity, such as an image of a tree that the user captured during a walk in a park. As yet another example, the data associated with a user can include physiological data generated during the user-performed activity, such as heart-rate data of the user during a hiking through a mountain trail. As another example, the data associated with a user can include motion data generated during the user-performed activity, such as average speed data associated with the user while skiing down a mountain. In some instances, the data associated with the user can be received at the mobile communication device of the user from a device other than the mobile communication device of the user, such as a compute device associated with a social media application or platform. For example, the data associated with the user can include media data such as image data, video data, or music data. In some instances, the data associated with the user can be received from a server. For example, the data associated with the user can include data stored on a cloud server (not shown) associated with the user. As another example, the data associated with the user can be received from a private server (not shown) of a party other than the user. In some instances, the data associated with the user can include location data. The location data, for example, can include GPS data.

In some instances, the predefined activity can be defined by a user of the mobile communication device. For example, a user can define an activity via a user interface module (such as user interface module 117 of FIG. 1) at the mobile communication device of the user. In another instance, the predefined activity can be defined by a party other than the user and a signal representing the predefined activity can be received by the mobile communication device of the user. Further to this example, the mobile communication device of the user can identify the user-performed activity (e.g., the user-performed activity defined by the user) based on data (e.g., such as activity data 112 of FIG. 1) associated with the user and/or the mobile communication device of the user.

A point-of-interest can be identified, at 404. In some instances, the point-of-interest can be defined at the mobile communication device of the user (e.g., such as user interface module 117 of FIG. 1). A point-of-interest can be identified from multiple points of interest based at least in part on at least one of (1) data associated with a user and/or a mobile communication device of the user, (2) data accessed at the mobile communication device, or (3) data accessed at the mobile communication device of the user, to produce a user-performed activity identifier. In some instances, the point-of-interest can be predefined by a user of the mobile communication device and/or a party other than the user of the mobile communication device. In some instances, predefined points of interest can include points of interest defined, received, and/or accessed by, from and/or at a compute device different than the mobile communication device of the user. For example, GPS coordinates of a point-of-interest, such as the Statue of Liberty, can be received from a server associated with a compute device different than the mobile communication device of the user. Points of interest can include, for example, a park, museum, tourist attraction, restaurant, shopping mall, amusement park ride, sporting event, mountain trail, restaurant, etc. A point-of-interest can be identified by a GPS at the mobile communication device of the user. The point-of-interest can be identified, for example, from multiple predefined points of interest based on data associated with the user.

At 406, a message can be defined. The message can be based on, for example, data associated a user, data received from and/or stored at a compute device, a format associated with a compute device and/or a mobile communication device of a user, data received, generated and/or accessed when the mobile communication device was located within a predefined range of a point-of-interest, data generated during the user-performed activity and/or data accessed during the user-performed activity. For example, the message can include video data captured by the user during a hike in the mountains, and/or text data including a description of the hiking trail. In a similar example, the video data can be associated with the user-performed activity (e.g., the hike), but captured prior to the user-performed activity. Further to this example, the text data can include data received from a compute device external to the mobile communication device of the user. As another example, the data generated when the mobile communication device was located within a predefined range of a point-of-interest can include image data captured by the mobile communication device of the user when the mobile communication device was located within a predefined range of a point-of-interest, such as Central Park in New York City. The message can be based on, for example, data associated with a point-of-interest. For example, the data can include text data that provides information related to the point-of-interest, such as current weather data at the Statue of Liberty.

As another example, the message can include an image stored on a compute device, such as a server of social media application or platform, and associated with the user-performed activity or a point-of-interest, such as an image of the user running near the Empire State Building that is posted to the user's social media account. As yet another example, the message can include a representation of music data that was accessed by the user during the user-performed activity, and image data associated with the music data, such as image data representing the musician of the music data or cover art work for the music data. Further to this example, the representation of the music data and/or the associated data can be either located on the mobile communication device of the user or on a compute device separate from the mobile communication device.

In some instances, more than one message can be defined. For example, a first message can include image data and video data, and a second message can include image data, video data, and music data. Further to this example, the image data in the first message can be different or the same as the image data in the second message.

At 408, a representation of the message or group of messages can be sent such that the representation of the message or group of messages is displayed at the mobile communication device of the user. In some instances, multiple representations of a message can be sent to the user such that the multiple representations are displayed at the mobile communication device. The multiple representations can be displayed at the mobile communication device concurrently or sequentially.

A user can approve of one or more of the multiple representations, or alter one or more of the multiple representations. If the user approves of one or more of the multiple representations, for example, the approved representation(s) can be sent to a compute device separate from the mobile communication device. In some instances, if the user alters one or more of the multiple representations, for example, the altered representation(s) can be sent to a compute device separate from the mobile communication device. As another example, the user can reject one or more of the representations. If the user rejects one or more of the representations, for example, a new message can be defined based on data associated with the user, data received from and/or stored at a compute device, a format associated with a compute device and/or a mobile communication device of a user, data generated when the mobile communication device was located within a predefined range of a point-of-interest, data generated during the user-performed activity, and/or data accessed during the user-performed activity. In some instances, based at least in part on the user's rejection of the message, the new message can be defined based on data and/or a format different than the data and/or format(s) on which the message defined at 406 was based; a representation of the new message can be sent such that the representation of the new message is displayed at the mobile communication device of the user.

The user can alter, approve, or reject the representation of the original or new message. The user's approval, alteration, or rejection of the representation of the message can be performed with a single user-input step. For example, a user can touch a digital screen to indicate confirmation of the representation of a message. In another instance, the user's approval, alteration, or rejection of the representation of the message can be performed with more than a single user-input step. In some instances, a second message can be produced based on an alteration of the representation of the message or a confirmation of the representation of the message.

Optionally, for example at 410, a representation of the second message and/or the new message can be sent to a compute device (such as compute device 130 of FIG. 1). The compute device can be selected from a list of predetermined or preselected compute devices. In some instances, the compute device can be separate from the mobile communication device of the user. For example, a compute device can include a social media application or platform, software to implement an email system that includes the email account of the user, blogging application or platform, repository of the user, a communication device other than the mobile communication device, etc.

While various embodiments have been described above, it should be understood that they have been presented by way of example only, and not limitation. Furthermore, although various embodiments have been described as having particular features and/or combinations of components, other embodiments are possible having a combination of any features and/or components from any of embodiments where appropriate as well as additional features and/or components.

Where methods described above indicate certain events occurring in certain order, the ordering of certain events may be modified. Additionally, certain of the events may be performed repeatedly, concurrently in a parallel process when possible, as well as performed sequentially as described above.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor-readable medium storing code representing instructions to be executed by a processor, the code comprising code to cause the processor to:
   identify a user-performed activity from a plurality of predefined user-performed activities based on at least one of data generated by a mobile communication device of the user, or data accessed at the mobile communication device, to produce a user-performed activity identifier;
   automatically identify, during the user-performed activity, a point-of-interest from a plurality of points of interest based on the data generated by the mobile communication device, to produce a point-of-interest identifier;
   automatically define a representation of a first message and a representation of a second message based at least in part on the point-of-interest identifier, the representation of the first message and the representation of the second message including image data (1) captured by a camera of the mobile communication device, and (2) associated with the point-of-interest, the representation of the first message being different than the representation of the second message;
   automatically cause the mobile communication device of the user to display the representation of the first message and the representation of the second message concurrently on the mobile communication device for the user to select at least one of the representation of the first message or the representation of the second message to produce at least one selected message; and
   send the at least one selected message via a social-media computer network to a compute device that is separate from the mobile communication device and that shares the at least one selected message.

2. The non-transitory processor-readable medium of claim 1, the code further comprising code to cause the processor to:
   receive, at the mobile communication device, a signal indicating a selection of the compute device from a plurality of compute devices,
   the code to cause the processor to send the at least one selected message includes code to cause the processor to send the at least one selected message to the compute device from the plurality of compute devices.

3. The non-transitory processor-readable medium of claim 1, wherein the representation of the first message and the representation of the second message are based at least in part on a format associated with the compute device.

4. The non-transitory processor-readable medium of claim 1, wherein the representation of the first message and the representation of the second message are based at least in part on a format associated with the compute device, the format including at least one of (1) a limit on a quantity of characters, (2) a data type, or (3) an application programming interface (API).

5. The non-transitory processor-readable medium of claim 1, wherein the code to cause the processor to cause the mobile communication device of the user to display the representation of the first message and the representation of the second message includes code to cause the processor to cause, without receiving an indication of a request from the mobile communication device, the mobile communication device of the user to display the representation of the first message and the representation of the second message concurrently.

6. A non-transitory processor-readable medium storing code representing instructions to be executed by a processor, the code comprising code to cause the processor to:
   identify a user-performed activity from a plurality of predefined user-performed activities based on at least one of (1) data associated with a user, (2) data generated at a mobile communication device of the user, or (3) data accessed at the mobile communication device, to produce a user-performed activity identifier;
   automatically define, in response to the identification of the user-performed activity, a representation of a first message and a representation of a second message based at least in part on at least one of the data associated with the user, the data generated at the mobile communication device, or the data accessed at the mobile communication device, the representation of the first message being different than the representation of the second message;
   cause the mobile communication device to display the representation of the first message and the representation of the second message concurrently on the mobile communication device for the user to select at least one of the representation of the first message or the representation of the second message to produce at least one selected message; and
   send the at least one selected message via a social-media computer network to a compute device that is separate from the mobile communication device and that shares the at least one selected message.

7. The non-transitory processor-readable medium of claim 6, wherein the representation of the first message and the representation of the second message include at least one of image data generated during the user-performed activity or video data generated during the user-performed activity.

8. The non-transitory processor-readable medium of claim 6, the code further comprising code to cause the processor to automatically identify, during the user-performed activity, a point-of-interest from a plurality of points-of-interest based on the data generated at the mobile communication device, the representation of the first message and the representation of the second message including a representation of data generated at the mobile communication device when the mobile communication device was located within a predefined range of the point-of-interest.

9. The non-transitory processor-readable medium of claim 6, wherein the data associated with the user is a first data and the compute device is a first compute device,
the code further comprising code to cause the processor to receive, from a second compute device different than the mobile communication device and the first compute device, a second data associated with the user,
the code to cause the processor to identify includes code to cause the processor to identify the user-performed activity from the plurality of predefined user-performed activities based at least in part on the second data to produce the user-performed activity identifier,
the code to cause the processor to define includes code to cause the processor to define the representation of the first message and the representation of the second message based at least in part on the second data and the user-performed activity identifier.

10. The non-transitory processor-readable medium of claim 1, wherein the code to cause the processor to automatically define the representation of the first message and the representation of the second message includes code to cause the processor to automatically define in response to detection of completion of the user-performed activity.

11. A non-transitory processor-readable medium storing code representing instructions to be executed by a processor, the code comprising code to cause the processor to:
receive, at a mobile communication device of a user and from a first compute device separate from the mobile communication device, activity data associated with the user;
identify a user-performed activity from a plurality of predefined user-performed activities based on the activity data to produce a user-performed activity identifier;
detect, at the mobile communication device, completion of the user-performed activity without involving a user-based touch gesture at the mobile communication device based on the activity data;
identify a point-of-interest from a plurality of points of interest and associated with a location in which the user-performed activity was performed based on location data generated by the mobile communication device;
without user-input to a messaging application of the mobile communication device, define, in response to the detection of the completion of the user-performed activity, a representation of a first message and a s representation of a second message including a representation of the point-of-interest, the representation of the first message being different than the representation of the second message;
cause the mobile communication device to display the representation of the first message and the representation of the second message concurrently on the mobile communication device for the user to select at least one of the representation of the first message or the representation of the second message to produce at least one selected message; and
send the at least one selected message via a social-media computer network to a second compute device that is separate from the mobile communication device and the first compute device, and that shares the at least one selected message.

12. The non-transitory processor-readable medium of claim 11, wherein the code to cause the processor to detect completion of the user-performed activity includes code to cause the processor to detect automatically completion of the user-performed activity.

13. The non-transitory processor-readable medium of claim 1, wherein at least one of the representation of the first message or the representation of the second message includes a representation of a playlist indicative of two or more songs played at the mobile communication device during the user-performed activity.

14. The non-transitory processor-readable medium of claim 1, wherein at least one of the representation of the first message or the representation of the second message includes a representation of an album cover associated with one or more songs played at the mobile communication device during the user-performed activity.

15. The non-transitory processor-readable medium of claim 1, the code further comprising code to cause the processor to:
identify a person within image data generated by the mobile communication device during the user-performed activity to produce a person identifier, at least one of the representation of the first message or the representation of the second message including a representation of the person identifier.

16. The non-transitory processor-readable medium of claim 6, wherein the at least one of the representation of the first message or the representation of the second message includes a representation of a playlist indicative of two or more songs played at the mobile communication device during the user-performed activity.

17. The non-transitory processor-readable medium of claim 6, wherein at least one of the representation of the first message or the representation of the second message includes a representation of an album cover associated with one or more songs played at the mobile communication device during the user-performed activity.

18. The non-transitory processor-readable medium of claim 6, the code further comprising code to cause the processor to:
identify a person within image data generated by the mobile communication device during the user-performed activity to produce a person identifier, at least one of the representation of the first message or the representation of the second message including a representation of the person identifier.

19. The non-transitory processor-readable medium of claim 1, wherein the compute device is a server associated with a social media application or platform.

20. The non-transitory processor-readable medium of claim 1, wherein the compute device is a server associated with a social media application or platform, the code to cause the processor to send the at least one selected message includes code to cause the processor to send the at least one selected message to the compute device such that the at least one selected message is posted to a social media account of the user.

21. The non-transitory processor-readable medium of claim 1, wherein the computer network is an Internet.

22. The non-transitory processor-readable medium of claim 6, wherein the compute device is a server associated with a social media application or platform and configured to post the at least one selected message to be accessed via an Internet.

23. The non-transitory processor-readable medium of claim 11, wherein the second compute device is a server associated with a social media application or platform and configured to post the at least one selected message to be accessed via an Internet.

24. The non-transitory processor-readable medium of claim 1, wherein the data generated by the mobile communication device is generated by a least one of an accelerometer of the mobile communication device or a global positioning receiver of the mobile communication device.

25. The non-transitory processor-readable medium of claim 1, wherein the user's selection of the at least one of the representation of the first message or the representation of the second message is performed with a single user-input step.

* * * * *